H. C. EGGERS.
AUTOMOBILE DIRECTION SIGNAL.
APPLICATION FILED AUG. 26, 1916.
1,229,246.
Patented June 12, 1917.
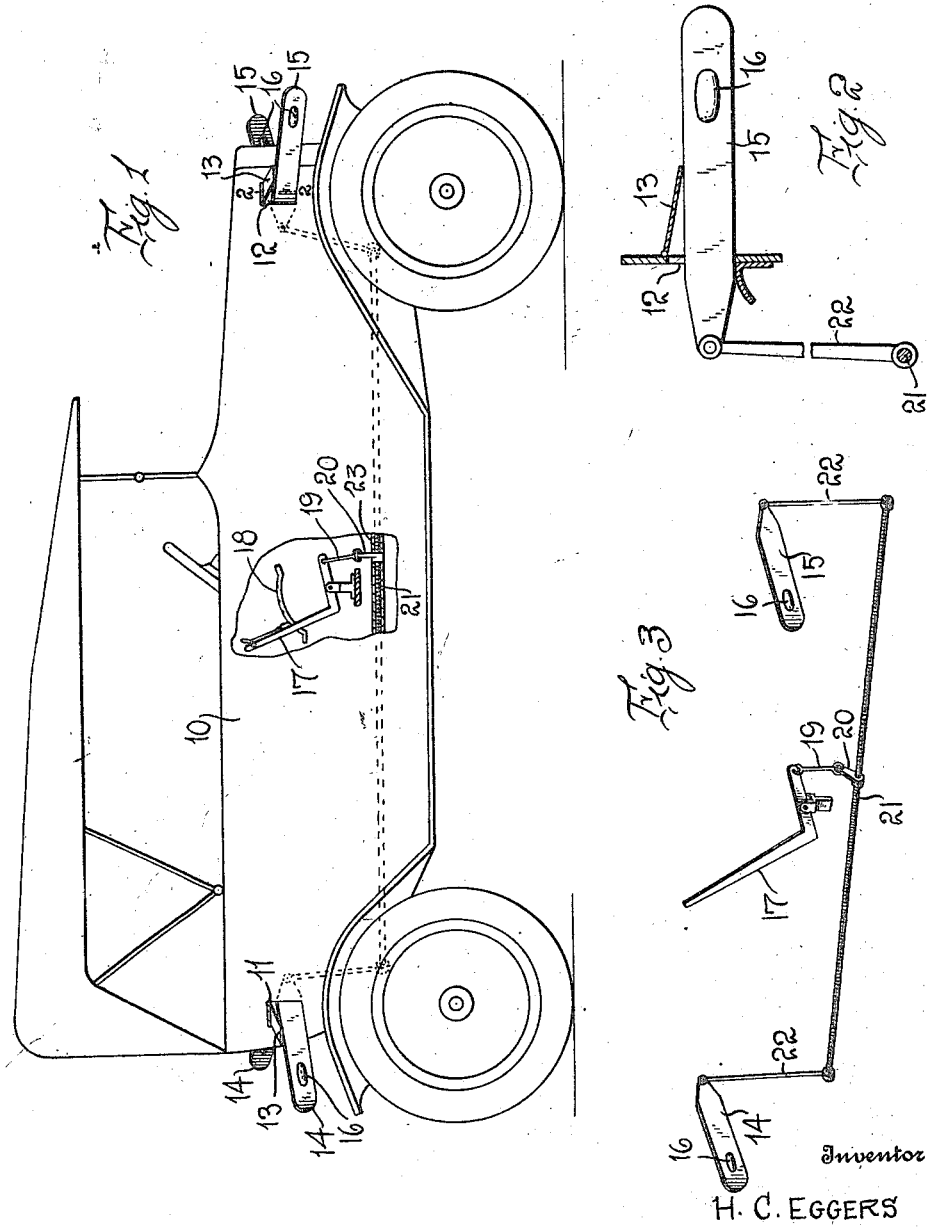
Inventor
H. C. EGGERS
By Watson E. Coleman
Attorney

UNITED STATES PATENT OFFICE.

HENRY CARL EGGERS, OF PORTSMOUTH, NEW HAMPSHIRE.

AUTOMOBILE DIRECTION-SIGNAL.

1,229,246.  Specification of Letters Patent.  Patented June 12, 1917.

Application filed August 26, 1916. Serial No. 117,074.

*To all whom it may concern:*

Be it known that I, HENRY C. EGGERS, a citizen of the United States, residing at Portsmouth, in the county of Rockingham and State of New Hampshire, have invented certain new and useful Improvements in Automobile Direction-Signals, of which the following is a specification, reference being had to the accompanying drawings.

This invention relates to signaling attachments for automobiles and particularly to signaling devices designed to show the direction in which a car is about to move or if the car is about to stop.

One object of my invention is the provision of a very simple signaling system which includes semaphores preferably disposed at the front and rear of the car and shiftable into or out of projected positions and a further object in this connection is to provide a signaling device in the nature of semaphores which are normally housed within the body of the car and concealed by doors, but which, when projected, automatically open the doors to permit the display of the semaphores.

A further object is to provide a very simple means for operating the semaphores.

My invention is illustrated in the accompanying drawings, wherein:

Figure 1 is a side elevation of an automobile provided with my signaling system, the side wheel of the automobile being partly broken away to show the actuating lever;

Fig. 2 is a fragmentary sectional view approximately on the line 2—2 of Fig. 1; and Fig. 3 is a perspective view of the signal arms and the means for operating the signal arms.

Referring to these drawings, 10 designates a car of any suitable character and having the openings 11 at its rear end on the sides of the car and the openings 12 at its forward end on the sides of the hood inclosing the engine. These openings 11 and 12 are normally closed by doors 13 which are hinged to the walls of the openings and which drop by gravity to a closing position, though the doors may be returned by springs or other suitable means. Suitably supported at the rear end of the car, within the body thereof, are semaphores 14 and at the forward end are the semaphores 15. These semaphores are preferably painted red, green or other suitable color to indicate danger and attract attention and are also provided with openings in which are disposed the electric lamps 16 which are to be used at night.

Pivotally mounted upon each side wall of the car is a lever 17 arranged so as to be convenient to the hand of the operator and moving over a locking rack 18, which lever is connected by a link 19 to an arm 20 mounted upon a flexible shaft 21. At the extremities of the flexible shaft are arms 22 which are pivotally connected at their upper ends to the semaphores 14 and 15. Preferably the shaft 21 is flexible and may be constructed in any suitable manner and preferably this flexible shaft passes through a housing 23 of rubber or other flexible material. The shaft 21 is a rock shaft and is of course operated by an oscillation of the lever 17.

When the lever on one side of the car is shifted over into an operative position, the semaphores on that side will be projected and when it is shifted to an inoperative position, they will be retracted. It will thus be obvious that the direction of the car may be readily indicated. On the other hand, when it is desired to indicate to following cars that an automobile is about to stop, both of the levers 5 are shifted to an operative position, whereupon both of the rear semaphores and both of the forward semaphores will be projected. I have not illustrated the connections of the lights 16 to a battery or other source of current as these connections will be obvious.

Having described my invention, what I claim is:

1. In a car, a body having openings on each side at its forward end, and openings on each side at its rear end, a pair of semaphore arms disposed behind the forward openings, a pair of semaphore arms disposed behind the rear openings, and manually operable means on each side of the body for projecting the semaphore arms on that side, said means being operatively connected to the corresponding semaphore arms.

2. In a car, a body having openings on each side at its forward end, and openings on each side at its rear end, a pair of semaphore arms disposed normally behind the forward openings, a pair of semaphore arms disposed normally behind the rear openings, rock shafts one on each side of the body, arms on the forward and rear ends of each rock shaft connected at their upper ends to said semaphores, and levers operatively connected one to each rock shaft.

3. In a car, a body having openings on each side at its forward end, and openings on each side at its rear end, a pair of semaphore arms disposed behind the forward openings, a pair of semaphore arms disposed behind the rear openings, flexible shafts disposed on each side of the body, manually operable means for rocking each shaft independently of the other shaft, arms at each end of the shaft extending to the semaphores, and a housing through which each flexible shaft passes.

In testimony whereof I hereunto affix my signature in the presence of two witnesses.

HENRY CARL EGGERS.

Witnesses:
FRANK J. MAYER,
EUGENE FERRIS.